(12) United States Patent
Doll et al.

(10) Patent No.: US 9,187,043 B2
(45) Date of Patent: Nov. 17, 2015

(54) PULLOUT MECHANISM FOR A DRAWER DEVICE, DRAWER DEVICE COMPRISING A PULLOUT MECHANISM AND VEHICLE COMPRISING A DRAWER DEVICE

(71) Applicant: Faurecia Innenraum Systeme GmbH, Hagenbach (DE)

(72) Inventors: Volker Doll, Ranschbach (DE); Karl-Friedrich Wingert, Billigheim-Ingenheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 244 days.

(21) Appl. No.: 13/856,368

(22) Filed: Apr. 3, 2013

(65) Prior Publication Data

US 2013/0257247 A1    Oct. 3, 2013

(30) Foreign Application Priority Data

Apr. 3, 2012  (DE) .......................... 10 2012 006832

(51) Int. Cl.
*A47B 88/00* (2006.01)
*B60R 7/04* (2006.01)
*A47B 88/04* (2006.01)
*A47B 88/14* (2006.01)

(52) U.S. Cl.
CPC ............... *B60R 7/04* (2013.01); *A47B 88/0466* (2013.01); *A47B 88/14* (2013.01); *A47B 2210/0043* (2013.01); *A47B 2210/0064* (2013.01); *A47B 2210/0072* (2013.01)

(58) Field of Classification Search
CPC .... A47B 88/00; A47B 88/04; A47B 88/0466; A47B 88/08; A47B 88/10; A47B 88/12; A47B 88/16; A47B 2210/0027; A47B 2210/0032; A47B 2210/004; A47B 2210/0043; A47B 2210/0045; A47B 2210/0059; A47B 2210/0064; A47B 2210/0067; A47B 2210/007; A47B 2210/0072; A47B 2210/0097; B60R 7/06; B60R 2011/0005
See application file for complete search history.

(56) References Cited

U.S. PATENT DOCUMENTS

| 399,752 | A |   | 9/1889  | Horrocks |
|---------|---|---|---------|----------|
| 2,267,043 | A | * | 12/1941 | Premo ............................ 384/18 |
| 3,124,401 | A | * | 3/1964  | McClellan .............. 312/334.13 |
| 3,679,275 | A | * | 7/1972  | Fall et al. ........................ 384/18 |

(Continued)

FOREIGN PATENT DOCUMENTS

| CH | 675957 A5 | 11/1990 |
| DE | 1866013   | 1/1963  |

(Continued)

*Primary Examiner* — Glenn Dayoan
*Assistant Examiner* — Paul Chenevert
(74) *Attorney, Agent, or Firm* — Reising Ethington P.C.

(57) ABSTRACT

A pullout mechanism for a drawer device includes a first and second guide surfaces, each extending from a first end to a second end, and first and second wheels which run on the respective first and second guide surfaces. The wheels are connected together in a rotationally fixed manner by a shaft mounted to the drawer device. The guide surfaces are provided for attachment to or formation on a frame, such as a frame of an interior trim part of a vehicle. Alternatively, the wheels can be connected to the frame and the guide surfaces to the drawer device. The pullout mechanism further includes first and second pulling devices such as cables, each of which at least partially encircles the first and second wheels, respectively, and is fastened in a pre-stressed manner to the two ends of the respective first and second guide surfaces.

20 Claims, 6 Drawing Sheets

(56) References Cited

U.S. PATENT DOCUMENTS

| | | | |
|---|---|---|---|
| 3,679,282 A * | 7/1972 | Kauffman | 312/311 |
| 3,722,964 A | 3/1973 | Chitester et al. | |
| 3,776,608 A * | 12/1973 | Fall et al. | 384/18 |
| 4,351,135 A * | 9/1982 | Freller | 52/67 |
| 4,974,285 A * | 12/1990 | Enrietti | 16/66 |
| 5,209,576 A * | 5/1993 | Kasai | 384/49 |
| 5,492,400 A * | 2/1996 | Rock | 312/331 |
| 8,152,250 B2 * | 4/2012 | Aguilar Ante et al. | 312/331 |
| 8,393,663 B2 * | 3/2013 | Gayon et al. | 296/37.12 |
| 2001/0000609 A1 * | 5/2001 | Rudick et al. | 221/6 |
| 2002/0063441 A1 * | 5/2002 | Young, Sr. | 296/165 |
| 2003/0039182 A1 * | 2/2003 | Mueller et al. | 369/30.63 |
| 2003/0197392 A1 * | 10/2003 | Clark et al. | 296/24.1 |
| 2006/0087208 A1 * | 4/2006 | Oh et al. | 312/402 |
| 2006/0238085 A1 * | 10/2006 | Greenberg | 312/306 |
| 2008/0211365 A1 * | 9/2008 | Moll et al. | 312/319.1 |
| 2011/0095557 A1 * | 4/2011 | Myers et al. | 296/37.8 |
| 2012/0247239 A1 * | 10/2012 | Hortig et al. | 74/89.22 |

FOREIGN PATENT DOCUMENTS

| | | | |
|---|---|---|---|
| DE | 2227931 A1 | 12/1972 | |
| DE | 19829363 A1 * | 1/2000 | B60R 7/04 |
| DE | 102010030136 A1 * | 12/2011 | A47B 88/04 |

* cited by examiner

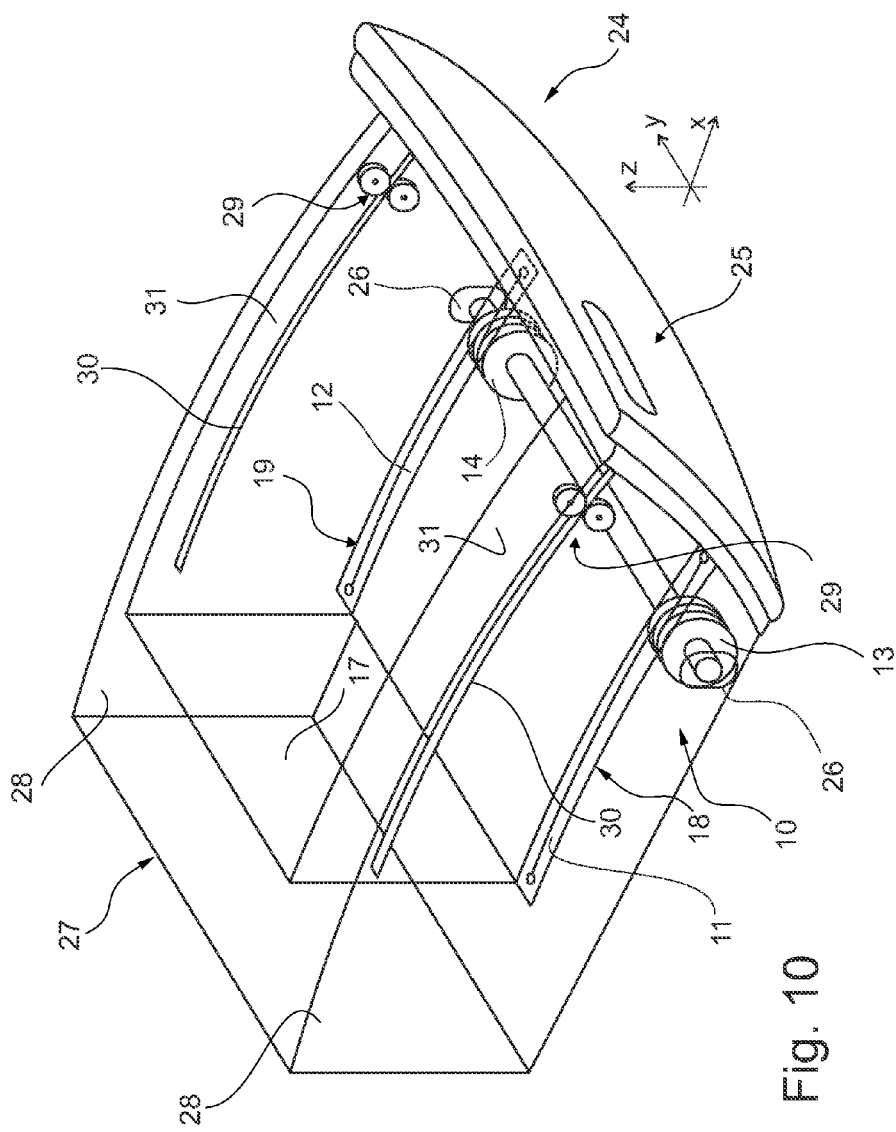

9,187,043 B2

PULLOUT MECHANISM FOR A DRAWER DEVICE, DRAWER DEVICE COMPRISING A PULLOUT MECHANISM AND VEHICLE COMPRISING A DRAWER DEVICE

TECHNICAL FIELD

The invention relates to a pullout mechanism for a drawer, a drawer device and vehicle comprising a drawer device.

BACKGROUND OF THE INVENTION

DE 1 866 013 U describes a guide arrangement on items of furniture for parts which can be pulled out on two guide and support faces, such as drawer devices.

It is an object of the invention to reduce the risk of tilting and jamming in a pullout mechanism for a drawer or a drawer device and to create a vehicle comprising such a pullout mechanism or comprising such a drawer device.

SUMMARY OF THE INVENTION

This object is achieved by the features of the independent claims. Further embodiments are described in the dependent claims.

According to a first aspect, the invention proposes a pullout mechanism for a drawer device, comprising:

at least one first guide surface with a first and a second end and at least one second guide surface with a first and a second end;

at least one first wheel which runs on the first guide surface and at least one second wheel which runs on the second guide surface;

wherein: the wheels are provided for attachment to the drawer device and the guide surfaces are provided for attachment or formation on a frame, in particular a frame of an interior trim part, or vice versa;

wherein the pullout mechanism also comprises:

at least one first pulling device, which at least partially encircles the first wheel and is fastened in a pre-stressed manner to the two ends of the first guide surface; and at least one second pulling device, which at least partially encircles the second wheel and is fastened in a pre-stressed manner to the two ends of the second guide surface.

According to a further embodiment the at least one first wheel and the at least one second wheel are connected to each other in a rotationally fixed manner.

As the pulling devices at least partially encircle the corresponding wheels assigned to them and are fastened in a pre-stressed manner to the corresponding guide surfaces assigned to them, wheels and guide surfaces are pressed against each other, so that they can no longer separate from each other so easily. Tilting and jamming during pulling out and pushing in is thus prevented or at least made more difficult in the proposed pullout mechanism.

The proposed pullout mechanism simply allows a motor drive for the drawer device, in that only one of the wheels comprises to be driven by a motor, as the others are also driven owing to the rotationally fixed connection. In addition, however, the other wheel can also be driven by a motor if required; any variation in synchronization of the motors is compensated by the rotationally fixed connection and therefore does not result in tilting.

The proposed pullout mechanism can be formed in any manner as required and for example have at least one additional guide surface and/or at least one additional wheel which runs on one of the guide surfaces and/or at least one additional pulling device, which at least partially encircles one of the wheels and is fastened in a pre-stressed manner to the two ends of a corresponding guide surface assigned to this wheel. Each additional wheel can for example run on the first or second guide surface or on one of the additional guide surfaces. Alternatively or additionally, each additional wheel can be connected in a rotationally fixed manner to the first or second wheel or to another of the additional wheels or to none of the other wheels. Each additional pulling device can for example at least partially encircle the first wheel and be fastened in a pre-stressed manner to the two ends of the first guide surface, or at least partially encircle the second wheel and be fastened in a pre-stressed manner to the two ends of the second guide surface.

Alternatively or additionally, each additional pulling device can at least partially encircle one of the additional wheels and be fastened in a pre-stressed manner to the two ends of a corresponding guide surface assigned to this wheel.

The first guide surface and the second guide surface can be arranged with respect to each other in any manner as required and for example point with their face normals in the same direction or else in different directions. For example, the face normals of the first guide surface can lie at any angle to the face normals of the second guide surface. In particular, both can point with their face normals vertically upwards or downwards or in a horizontal direction, but also in any other direction, for example obliquely upwards or downwards. Alternatively, one guide surface can in particular point with its face normal vertically upwards and the other guide surface can point with its face normal vertically downwards or in a horizontal direction or in any other direction, for example obliquely upwards or downwards. Alternatively, one guide surface can in particular point with its face normal vertically downwards and the other guide surface can point with its face normal vertically upwards or in a horizontal direction or in any other direction, for example obliquely upwards or downwards. Alternatively, one guide surface can in particular point with its face normal in a horizontal direction and the other guide surface can point with its face normal vertically upwards or downwards or in any other direction, for example obliquely upwards or downwards. Alternatively, one guide surface can in particular point with its face normal obliquely upwards and the other guide surface can point with its face normal vertically upwards or downwards or in a horizontal direction or in any other direction, for example obliquely downwards. Alternatively, one guide surface can in particular point with its face normal obliquely downwards and the other guide surface can point with its face normal vertically upwards or downwards or in a horizontal direction or in any other direction, for example obliquely upwards.

Each wheel can be formed in any manner as required, in particular such that they fit the corresponding pulling device assigned to them.

The pulling device preferably encircle the corresponding wheels assigned to them completely at least once or at least twice.

It can be provided for the guide surfaces to run parallel to each other.

It can be provided for the guide surfaces to be curved, for example at least partially upwards and/or at least partially downwards, in particular at their end sections. The guide surfaces can however be formed in another manner, for example straight, if required.

It can be provided for each proposed pullout mechanism to have additionally at least one shaft, which connects the wheels or at least the first and second wheels to each other in a rotationally fixed manner. Each shaft can be formed in any manner as required, for example in one piece or in two or more pieces. If a shaft is in two or more pieces and correspondingly comprises for example two or more part-shafts, in each case two adjacent part-shafts can be connected to each other in a rotationally fixed manner, for example by means of a universal joint or constant velocity joint, and thus form a universal shaft. Alternatively or additionally, each shaft and/or part-shaft can be rigid or flexible. A flexible shaft or a universal shaft allows the rotationally fixed connection of two wheels, the axles of which do not align or are not coaxial.

The shaft allows a motor drive for the drawer device in an extremely simple manner, in that only it comprises to be driven by a motor, as the corresponding wheels assigned to it are connected in a rotationally fixed manner by it and are driven as well. In addition, however, at least one of the corresponding wheels can also be driven by a motor if required; any variation in synchronization of the motors is compensated by the rotationally fixed connection and therefore does not result in tilting.

It can be provided for each proposed pullout mechanism to have additionally at least one first rail with a surface which forms the first guide surface and at least one second rail with a surface which forms the second guide surface. Each additional guide surface can also be formed by a corresponding surface of the first or the second or an additional rail, if required. The rails can be attached if required to the drawer device or to a frame or case on which the drawer device is to be held in a displaceable manner by means of the pullout mechanism. The frame can for example belong to an interior trim part, in particular to an interior trim part of a vehicle, such as a dashboard of a car. Alternatively, each guide surface can be formed on the drawer device or the frame itself if required.

It can be provided for at least one wheel to have at least one helical groove, in which the corresponding pulling device assigned to the wheel is guided or lies. The helical groove forms a thread-like or screw-like or corkscrew-like or helical contour and ensures trouble-free guidance of the corresponding pulling device. Each helical groove can be formed in any manner as required and for example run coaxially to the axle of the wheel and/or run around the wheel axle at least once and/or be so deep and/or so wide that the pulling device guided in it does not or does project radially outwards from the running face. Its pitch can be selected as required and be constant or variable. The number of coils of the corresponding pulling device, which corresponds to the number of windings of the helical groove in which it lies, is preferably less than the number of windings of the helical groove.

Alternatively or additionally, at least one wheel can have in its running face at least one annular groove, in which the corresponding pulling device assigned to the wheel is guided or lies. An annular groove means a groove which runs completely around the wheel axle once and is closed in on itself in the manner of a ring and does not have any free ends. Each annular groove can be formed in any manner as required and for example run coaxially to the wheel axle or have the basic shape of a circle or run obliquely, that is, not coaxially to the wheel axle or have the basic shape of an ellipse and/or be so deep and/or so wide that the pulling device guided in it does not or does project radially outwards from the running face.

It can be provided for at least one pulling device to be fastened to the corresponding wheel. Slipping between the pulling device and the wheel is thereby reliably avoided. Fastening can take place in any manner as required, for example by adhesive bonding, welding, clamping and/or soldering and/or by means of nails, wedges and/or screws.

It can be provided for:
at least one pulling device to have at least one first part-pulling device and at least one second part-pulling device;
the first part-pulling device to be fastened in a pre-stressed manner to the first end of the corresponding guide surface and the corresponding wheel;
the second part-pulling device to be fastened in a pre-stressed manner to the second end of the corresponding guide surface and the corresponding wheel.

Each pulling device can be formed in any manner as required and for example have at least one wire, preferably comprising stainless steel and/or plastic, and/or at least one cable, preferably with carbon fibers and/or aramid fibers and/or polyethylene fibers and/or glass fibers and/or steel wires, and/or at least one chain.

However, it is preferably provided for at least one pulling device to have at least one cable and/or at least one wire. This is because cables and wires are more simply constructed than chains and more cost-effective and much quieter during movement.

It can be provided for at least one guide surface and/or at least one running face to have at least one noise-absorbing coating. The coating can for example have a soft and/or elastic and/or resilient coat or layer, in particular a band or strip comprising of felt and/or rubber and/or foam.

According to a second aspect, the invention proposes a drawer device comprising at least one push body and at least one pullout mechanism, wherein the pullout mechanism comprises:
at least one first guide surface with a first and a second end and at least one second guide surface with a first and a second end;
at least one first wheel which runs on the first guide surface and at least one second wheel which runs on the second guide surface and is connected in a rotationally fixed manner to the first wheel;
wherein:
the wheels are attached to the push body and the guide surfaces are provided for attachment to a frame, in particular a frame of an interior trim part, or the guide surfaces are attached to or formed on the push body and the wheels are provided for attachment to a frame, in particular a frame of an interior trim part;
wherein the pullout mechanism also comprises:
at least one first pulling device, which at least partially encircles the first wheel and is fastened in a pre-stressed manner to the two ends of the first guide surface; and
at least one second pulling device, which at least partially encircles the second wheel and is fastened in a pre-stressed manner to the two ends of the second guide surface.

As the pulling device at least partially encircle the corresponding wheels assigned to them and are fastened in a pre-stressed manner to the corresponding guide surfaces assigned to them, wheels and guide surfaces are pressed against each other, so that they can no longer separate from each other so easily. Tilting and jamming of the drawer device or of the pullout mechanism during pulling out and pushing in is thus prevented or at least made more difficult in the proposed drawer device.

The proposed drawer device can simply be provided with a motor drive for the push body, in that only one of the wheels comprises to be driven by a motor, as the others are also driven owing to the rotationally fixed connection. In addition, however, the other wheel can also be driven by a motor if required;

any variation in synchronization of the motors is compensated by the rotationally fixed connection and therefore does not result in tilting.

The proposed drawer device can be formed in any manner as required and for example have at least one additional push body and/or at least one additional pullout mechanism.

The guide surfaces can be attached if required to the push body or to a frame or case on which the drawer device is to be held in a displaceable manner by means of the pullout mechanism. The frame can for example belong to an interior trim part, in particular to an interior trim part of a vehicle, such as a dashboard of a car. Alternatively, each guide surface can be formed on the push body or the frame itself if required.

It can be provided for at least one of the pullout mechanisms to be one of the pullout mechanisms proposed by the invention.

According to a third aspect, the invention proposes a vehicle comprising a vehicle body, at least one drawer device and at least one pullout mechanism, wherein the pullout mechanism comprises:

- at least one first guide surface with a first and a second end and at least one second guide surface with a first and a second end;
- at least one first wheel which runs on the first guide surface and at least one second wheel which runs on the second guide surface and is connected in a rotationally fixed manner to the first wheel;
- at least one first pulling device, which at least partially encircles the first wheel and is fastened in a pre-stressed manner to the two ends of the first guide surface; and
- at least one second pulling device, which at least partially encircles the second wheel and is fastened in a pre-stressed manner to the two ends of the second guide surface;
- wherein the wheels are coupled to the drawer device and the guide surfaces are attached to or formed on the body or the guide surfaces are attached to or formed on the drawer device and the wheels are coupled to the vehicle body.

As the pulling device at least partially encircle the corresponding wheels assigned to them and are fastened in a pre-stressed manner to the corresponding guide surfaces assigned to them, wheels and guide surfaces are pressed against each other, so that they can no longer separate from each other so easily. Tilting and jamming of the drawer device when it is pulled out and pushed in is thus prevented or at least made more difficult in the proposed vehicle.

The proposed vehicle can simply be provided with a motor drive for the drawer device, in that only one of the wheels comprises to be driven by a motor, as the others are also driven owing to the rotationally fixed connection. In addition, however, the other wheel can also be driven by a motor if required; any variation in synchronization of the motors is compensated by the rotationally fixed connection and therefore does not result in tilting.

The proposed vehicle can be formed in any manner as required and for example have at least one additional push body and/or at least one additional pullout mechanism.

It can be provided for:
- the vehicle body to have at least one interior trim part with at least one frame;
- the guide surfaces to be attached to or formed on the vehicle body in that they are attached to or formed on the frame or the wheels are coupled to the vehicle body in that they are coupled to the frame.

It can be provided for at least one of the drawer devices to be one of the drawer devices proposed by the invention and/or at least one of the pullout mechanisms to be one of the pullout mechanisms proposed by the invention.

The configurations for one of the aspects of the invention, in particular for individual features of this aspect, apply analogously to the other aspects of the invention.

Embodiments and exemplary embodiments of the inventions are explained in more detail by way of example below using the attached drawings. The individual features which are apparent therefrom are however not restricted to the individual embodiment and exemplary embodiments but can be connected with other above-described individual features and/or with individual features of other embodiments and exemplary embodiments. The details in the drawings should be interpreted as being merely explanatory and not limiting. The reference symbols in the claims should not in any way limit the scope of protection of the invention, but merely refer to the embodiments shown in the drawings.

BRIEF DESCRIPTION OF THE DRAWINGS

Embodiments of the invention will hereinafter be described in conjunction with the appended drawings, wherein like designations denote like elements, and wherein:

FIG. 10 shows a perspective view of another embodiment of the drawer device with the pullout mechanism of FIG. 1.

DETAILED DESCRIPTION OF THE ILLUSTRATED EMBODIMENTS

Figure 1:
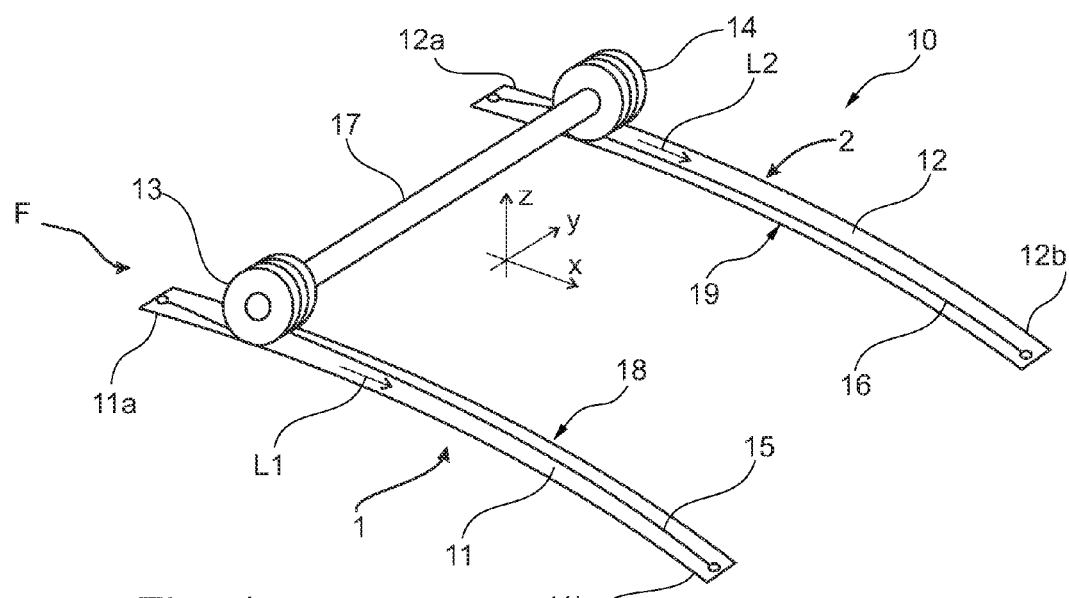
FIG. 1 shows a perspective view of a first embodiment of a pullout mechanism for a drawer device.
Figure 7:
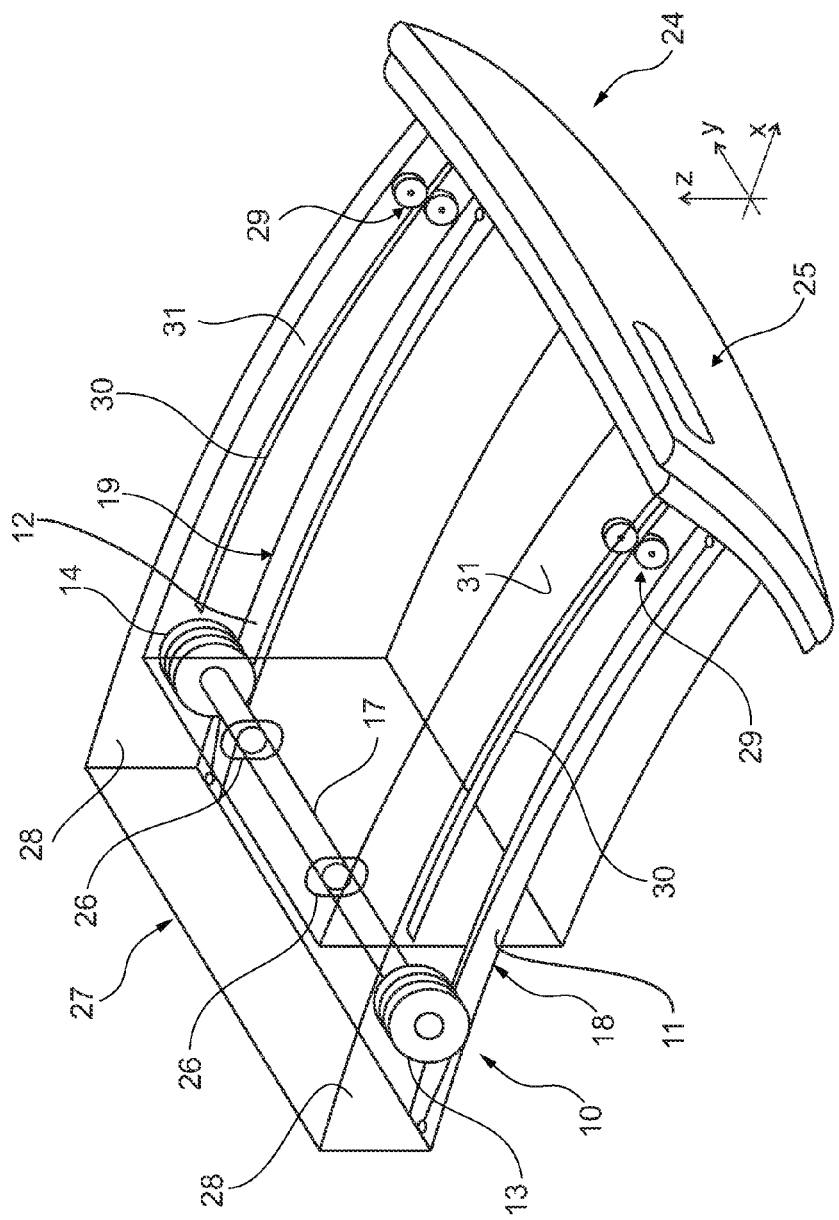
FIG. 7 shows a perspective view of a first embodiment of a drawer device with the pullout mechanism of FIG. 1.

FIG. 1 schematically shows a first embodiment of a pullout mechanism 10 for a drawer device (FIG. 7). This pullout mechanism 10 comprises a first guide surface 11 with a first and a second end section or end 11a, 11b, a second guide surface 12 with a first and a second end section or end 12a, 12b, a first wheel 13 and a second wheel 14, a first pulling device 15 and a second pulling device 16. The first wheel 13 runs on the first guide surface 11 as it rotates thereon and also the second wheel 14 runs on the second guide surface 12 as it rotates thereon. The first pulling device 15 encircles the first wheel 13 once and is fastened in a pre-stressed manner to two end sections or the two ends 11a, 11b of the first guide surface 11. The second pulling device 12 encircles the second wheel 14 once and is fastened in a pre-stressed manner to two end sections or the two ends 12a, 12b of the second guide surface 12. According to a further embodiment, the pullout mechanism 10 comprises a shaft 17 is fastened to the wheels 13, 14 at its ends and thus connects the wheels 13, 14 to each other in a rotationally fixed manner, wherein the wheels 13, 14 and the shaft 17 lie coaxially on one rotational axle.

For orientation, FIG. 1 shows a local rectangular co-ordinate system with an x-axis, a y-axis and a z-axis. The direction of the x-axis is identical to the local longitudinal direction L1, L2 of the respective guide surface 11, 12. The x-axis is in this case horizontal and runs obliquely from the top left to the bottom right in FIG. 1. The direction of the y-axis is preferably placed in the direction of the shortest distance between the two guide surfaces 11, 12. The y-axis is in this case horizontal and runs obliquely from the bottom left to the top right in FIG. 1. The direction of the z-axis is at right angles to the x-axis and y-axis and runs vertically from bottom to top in FIG. 1.

In relation to this co-ordinate system, the guide surfaces 11, 12 run substantially parallel to the x-axis from back to front, which thus also applies to the running direction of the wheels 14, 15. The shaft 17 runs parallel to the y-axis from left to right. The x-axis is thus oriented in the pulling-out direction of a drawer device fastened to the shaft 17.

In this first embodiment, the guide surfaces 11, 12 are curved or bent in their longitudinal extent in such a manner that the two second ends 11b, 12b lie further down than the two first ends 11a, 12a in relation to the z-axis. In particular, the guide surfaces 11, 12 are curved or bent such that they form a convex surface with a uniform curvature when viewed from the top or in a direction contrary to the z-direction. The guide surfaces 11, 12 can however be curved or bent or shaped in any other way and can in particular be straight.

In this first embodiment, the wheels 13, 14 are provided for attachment to the drawer device and the guide surfaces 11, 12 are provided for attachment to a frame 27. In FIG. 7 a frame 27 is shown in a schematic manner. The pullout mechanism 10 also comprises a first rail 18 with a surface which forms the first guide surface 11 and a second rail 19 with a surface which forms the second guide surface 12. The rails 18, 19 in this case have rectangular sheet metal strips, the upward-facing surfaces of which form the guide surfaces 11, 12. The rails 18, 19 can be attached to mutually facing inner sides of a recess in the frame which is to receive the drawer device.

Figure 2:
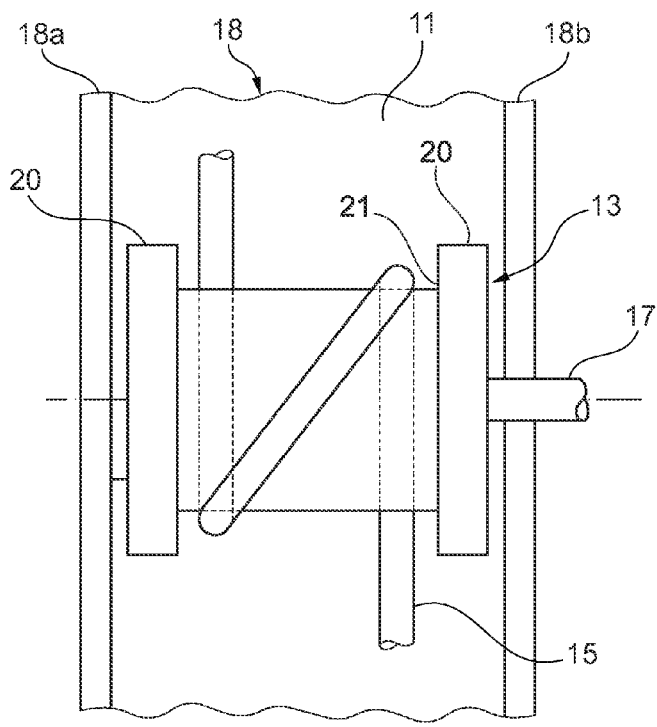
FIG. 2 shows an enlarged plan view of a section of FIG. 1 with a first wheel formed according to a first embodiment, a first pulling device formed according to a first embodiment and a rail of the pullout mechanism formed according to a first embodiment.

FIG. 2 schematically shows the first wheel 13, formed according to the first embodiment, of the pullout mechanism 10 of FIG. 1. It comprises a wheel body which comprises plastic and comprises a cylindrical running face 20 and a cylindrical annular groove 21 in the running face 20.

According to an embodiment of the pullout mechanism 10 for a drawer device 24, the pullout mechanism 10 comprises:
a first guide surface 11 with a first and a second end 11a, 11b and a second guide surface 12 with a first and a second end 12a, 12b,
a first wheel 13 for being rotated on a first guide surface 11 and a second wheel 14 for being rotated on a second guide surface 12 and is connected in a rotationally fixed manner to the first wheel 13, wherein the wheels 13, 14 are provided for being coupled to the drawer device 24 and the guide surfaces 11, 12 are part of a frame which is provided such that the drawer device 24 is moveable therein (e.g., FIG. 7), wherein a first flexible pulling device 15, which at least partially encircles the first wheel 13 and is fastened in a pre-stressed manner with a first end section to a first end of the first guide surface 11 and with a second end to a second end of the first guide surface 11, and
a second flexible pulling device 16, which at least partially encircles the second wheel 14 and is fastened in a pre-stressed manner with a first end section to a first end of the second guide surface 12 and with a second end to a second end of the second guide surface 12.

According to an embodiment of the pullout mechanism 10 for a drawer device 24, the pullout mechanism 10 comprises:
a first guide surface 11 with a first and a second end 11a, 11b and a second guide surface 12 with a first and a second end 12a, 12b;
a first wheel 13 for being rotated along the first guide surface 11 and a second wheel 14 for being rotated on a second guide surface 12 and is connected in a rotationally fixed manner to the first wheel 13, wherein the wheels 13, 14 are provided for being coupled to a frame which is provided such that the drawer device 24 is moveable therein and the guide surfaces 11, 12 are part of the drawer device 24 (e.g., FIG. 10), wherein a first flexible pulling device 15, which at least partially encircles the first wheel 13 and is fastened in a pre-stressed manner with a first end section to a first end of the first guide surface 11 and with a second end to a second end of the first guide surface 11; and
a second flexible pulling device 16, which at least partially encircles the second wheel 14 and is fastened in a pre-stressed manner with a first end section to a first end of the second guide surface 12 and with a second end to a second end of the second guide surface 12.

FIG. 2 also schematically shows the first pulling device 15, formed according to the first embodiment, of the pullout mechanism 10 of FIG. 1. It comprises a cable comprising of aramid fibers and comprises a cross section, the diameter of which is less than the depth of the annular groove 21, that is, the radial distance between the running face 20 and the bottom of the annular groove 21. Consequently, the first pulling device 15 which is guided in it does not project radially outwards from the running face 20. It can easily be seen that the first pulling device 15 is wound or looped once helically and tightly around the cylindrical bottom of the annular groove B21 and thus around the first wheel 13.

These configurations apply analogously to the second wheel 14 and the second pulling device 16 of the pullout mechanism 10 of FIG. 1.

FIG. 2 furthermore schematically shows a first embodiment of the first rail 18. In this embodiment, the first rail 18 is formed by a sheet metal strip, the side edges 18a of which, which are parallel to the longitudinal direction, are bent upwards and thus delimit the first guide surface 11 on both longitudinal sides and form lateral guides for the first wheel 13.

These configurations apply analogously to the second rail 19 of the pullout mechanism 10 of FIG. 1.

Figure 3:
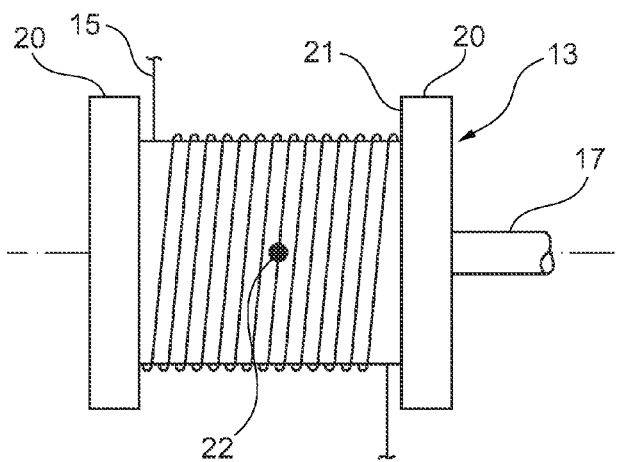
FIG. 3 shows a plan view of a second embodiment of the first wheel and a second embodiment of the first pulling device.

FIG. 3 schematically shows a second embodiment of the first wheel 13, which is similar to the first embodiment, so only the differences are explained in detail below. In this embodiment the wheel body is formed from steel.

FIG. 3 also schematically shows a second embodiment of the first pulling device 15, which is similar to the first embodiment, so only the differences are explained in detail below. In this embodiment the first pulling device 15 comprises a wire comprising of stainless steel and is wound or looped fourteen times helically and tightly around the cylindrical bottom of the annular groove 21 and thus around the first wheel 13.

The first pulling device 15 is fastened at a fastening point 22 by welding to the bottom of the annular groove 21 and thus to the first wheel 13.

These configurations apply analogously to the second wheel 14 and the second pulling device 16.

Figure 4:
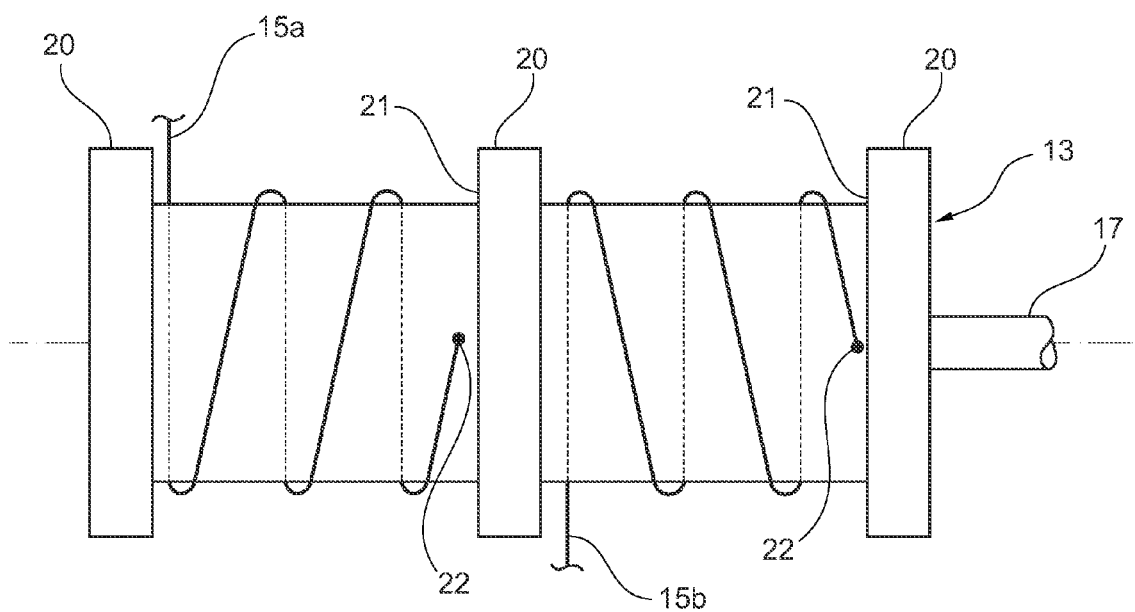
FIG. 4 shows a plan view of a third embodiment of the first wheel and a third embodiment of the first pulling device.

FIG. 4 schematically shows a third embodiment of the first wheel 13, which is similar to the second embodiment, so only the differences are explained in detail below. In this embodiment, the running face 20 comprises two separate annular grooves 21, which lie in the outer half, which is further away from the shaft 17 and on the left in FIG. 4, and in the inner half, which is closer to the shaft 17 and on the right in FIG. 4, of the running face 20 respectively.

FIG. 4 also schematically shows a third embodiment of the first pulling device 15, which is similar to the second embodiment, so only the differences are explained in detail below. In this embodiment the first pulling device 15 comprises a first and a second part-pulling device 15a, 15b, which each have a cable comprising of stainless steel wires. The first part-pulling device 15a is fastened to the first end 11a of the first guide surface 11 in a pre-stressed manner, wound or looped several times helically and tightly around the cylindrical bottom of the outer annular groove 21 and thus around the first wheel 13, and fastened at a first fastening point 22 by welding to the bottom of the outer annular groove 21 and thus to the first wheel 13. The second part-pulling device 15b is fastened to the second end 11b of the first guide surface 11 in a pre-stressed manner, wound or looped several times helically and tightly around the cylindrical bottom of the inner annular groove 21 and thus around the first wheel 13, and fastened at a second fastening point 22 by welding to the bottom of the inner annular groove 21 and thus to the first wheel 13.

These configurations apply analogously to the second wheel 14 and the second pulling device 16.

Figure 5:
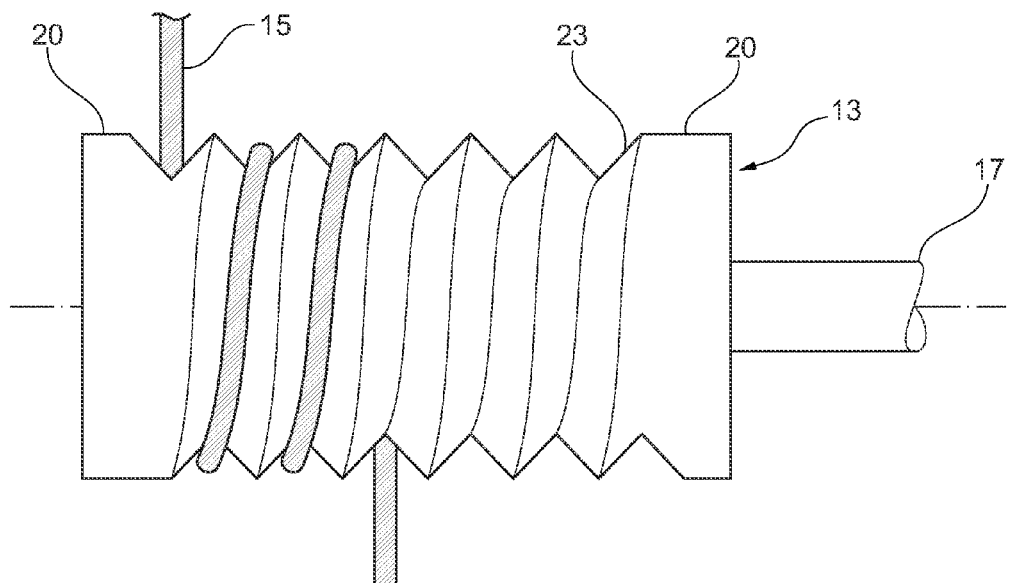
FIG. 5 shows a plan view of a fourth embodiment of the first wheel and a first pulling device formed according to the first embodiment.

FIG. 5 schematically shows a fourth embodiment of the first wheel 13, which is similar to the first embodiment, so only the differences are explained in detail below. In this embodiment the running face 20 comprises a helical groove 23 in the form of an external thread with five windings. The helical groove 23 is in this case formed as a pointed thread, but can also have any other shape as required and for example be formed as a trapezoidal thread, sawtooth thread, round thread or flat thread.

FIG. 5 also schematically shows the first pulling device 15 in the first embodiment of FIG. 2. In contrast to FIG. 2, the first pulling device 15 in this case lies in the helical groove 23 and is wound or looped twice tightly around the first wheel 13 and thus lies in two windings of the helical groove 23. In general terms, the number of coils of the first pulling device 15, which corresponds to the number of windings of the corresponding helical groove 23 assigned to it and in which it lies, should be less than the number of windings of the corresponding helical groove 23.

It can easily be seen in FIG. 5 that the profile of the helical groove 23, in particular its depth and width, is selected with regard to the cross section and/or thickness of the first pulling device 15 such that the pulling device 15 guided in it does not project radially outwards from the running face 20.

These configurations apply analogously to the second wheel 14 and the second pulling device 16.

Figure 6:
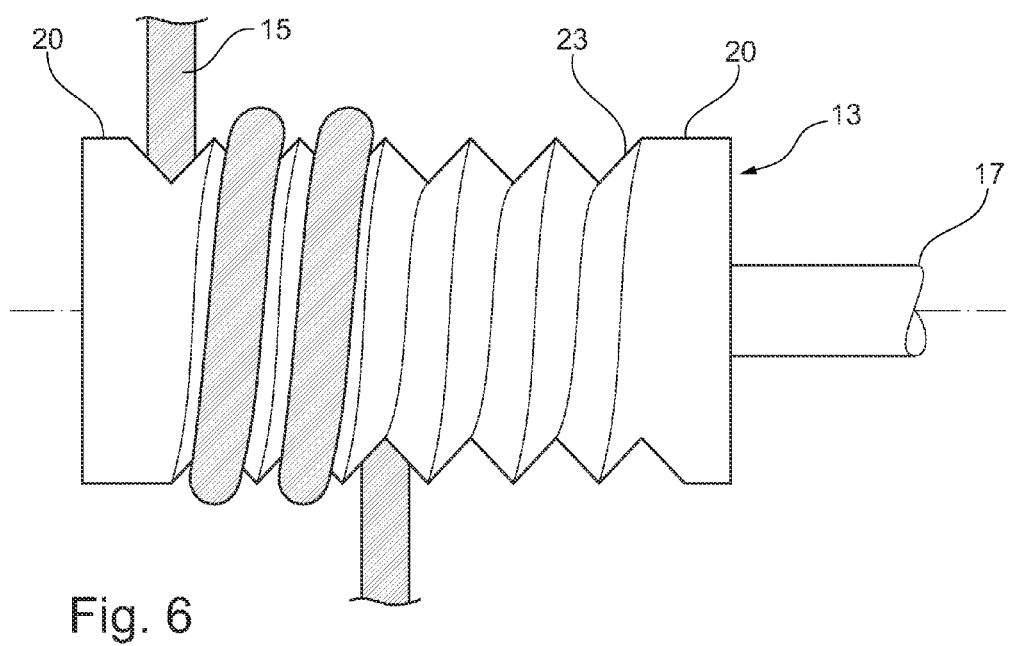
FIG. 6 shows a plan view of a first wheel formed according to the fourth embodiment and a fourth embodiment of the first pulling device.

FIG. 6 schematically shows the first wheel 13 in the fourth embodiment of FIG. 5 and also a fourth embodiment of the first pulling device 15, which is similar to the first embodiment, so only the differences are explained in detail below. In this embodiment the cross section and/or the thickness of the first pulling device 15 is selected with regard to the profile of the helical groove 23, in particular its depth and width, such that the first pulling device 15 guided in it projects radially outwards from the running face 20. The first pulling device 15 can thus act as a buffer or damping means between the wheel 13 and the guide surface 11 or rail 18.

These configurations apply analogously to the second wheel 14 and the second pulling device 16.

FIG. 7 schematically shows a first embodiment of a drawer device 24, wherein the covered line is not omitted or dashed but solid.

For orientation, the local rectangular co-ordinate system of FIG. 1 is shown in FIG. 7.

In this first embodiment, the drawer device 24 comprises a push body 25 and the pullout mechanism 10 of FIG. 1. The push body 25 comprises a rear wall, which lies at the back in relation to the co-ordinate system, a front wall, which lies at the front in relation to the co-ordinate system, and two parallel side walls, which connect the rear wall to the front wall and lie to the left and right in relation to the co-ordinate system. The wheels 13, 14 are attached to the push body 25 in that the shaft 17 is held in two bearings 26 on the rear side, which faces backwards in relation to the co-ordinate system, of the rear wall.

FIG. 7 also schematically shows a frame 27 of an interior trim part of a motor vehicle, which comprises a recess for receiving the push body 25 and two mutually facing inner sides 28, which delimit the recess and run parallel to the side walls of the push body 25.

In this first embodiment the rails 18, 19 are attached to the inner sides 28.

The drawer device 24 additionally comprises two supporting wheel pairs 29 and two supporting rails 30. The supporting wheel pairs 29 are each attached to the inner sides 28 of the frame 27, on the front end thereof in relation to the co-ordinate system. The supporting rails 30 are each attached to the outer sides 31, which face outwards towards the inner sides 28 of the frame 27, of the side walls of the push body 25 and run above the rails 18, 19 parallel to the latter over virtually the entire length of the side walls of the push body 25 from its rear wall to its front wall.

According to an embodiment of the drawer device 24, the drawer device 24 comprises a frame 27 with a first guide surface 11 and a second guide surface 12, a push body 25 and a pullout mechanism 10, wherein the first guide surface 11 and a second guide surface 12 are running along each other and wherein the pullout mechanism 10 comprises:
  a first wheel 13 which runs along the first guide surface 11 and a second wheel 14 which runs along the second guide surface 12, wherein the wheels 13, 14 are coupled to the push body 25 and the guide surfaces 11, 12 are provided for attachment to a frame 27 (e.g., FIG. 7), in particular a frame 27 of an interior trim part, or the guide surfaces 11, 12 are attached to or formed on the push body 25 and the wheels 13, 14 are provided for attachment to a frame 27 (e.g., FIG. 10), in particular a frame 27 of an interior trim part,
  a first flexible pulling device 15, which at least partially encircles the first wheel 13 and is fastened in a pre-stressed manner with a first end section to a first end of the first guide surface 11 and with a second end to a second end of the first guide surface 11, and
  a second flexible pulling device 16, which at least partially encircles the second wheel 14 and is fastened in a pre-stressed manner with a first end section to a first end of the second guide surface 12 and with a second end to a second end of the second guide surface 12.

According to another embodiment of the drawer device 24, the drawer device 24 comprises a frame 27, a push body 25 with a first guide surface 11 and a second guide surface 12 and a pullout mechanism 10, wherein the first guide surface 11 and a second guide surface 12 are running along each other and wherein the pullout mechanism 10 comprises:
- a first wheel 13 which runs along the first guide surface 11 and a second wheel 14 which runs along the second guide surface 12, wherein the wheels 13, 14 are coupled to the frame 27 (e.g., FIG. 10),
- a first flexible pulling device 15, which at least partially encircles the first wheel 13 and is fastened in a pre-stressed manner with a first end section to a first end of the first guide surface 11 and with a second end to a second end of the first guide surface 11, and
- a second flexible pulling device 16, which at least partially encircles the second wheel 14 and is fastened in a pre-stressed manner with a first end section to a first end of the second guide surface 12 and with a second end to a second end of the second guide surface 12.

Generally, the frame 27 can be part or a component of an interior trim part.

Figure 8:
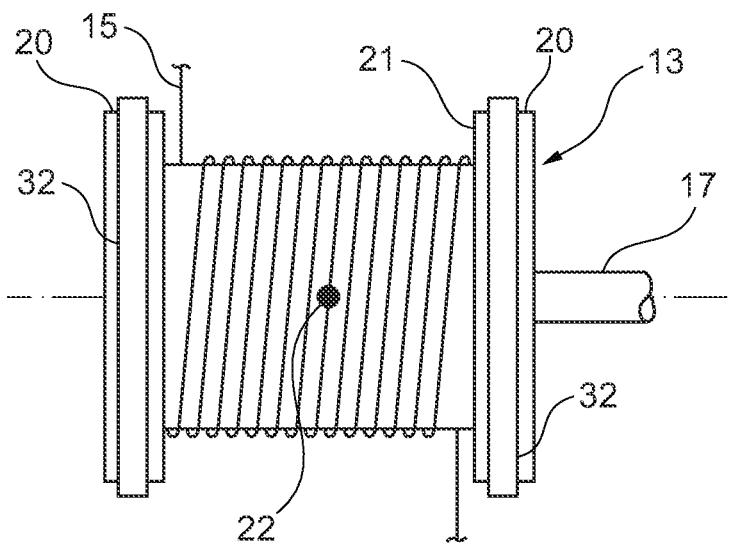
FIG. 8 shows a plan view of a fifth embodiment of the first wheel.

FIG. 8 schematically shows a fifth embodiment of the first wheel 13, which is similar to the second embodiment, so only the differences are explained in detail below. In this embodiment the running face 20 comprises a noise-absorbing coating 32, which comprises two annular bands of rubber.

These configurations apply analogously to the second wheel 14 of the pullout mechanism 10 of FIG. 1.

Figure 9:
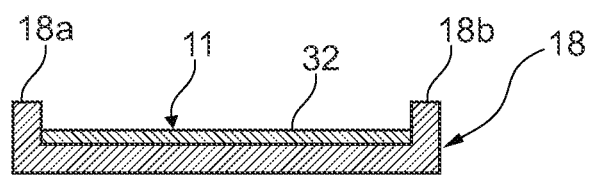
FIG. 9 shows a cross section of a second embodiment of the rail.

FIG. 9 schematically shows a second embodiment of the first rail 18, which is similar to the first embodiment, so only the differences are explained in detail below. In this embodiment, the first guide surface 11 comprises a noise-absorbing coating 32, which comprises a strip of felt which extends between the side edges 18a and between the two ends 11a, 11b.

These configurations apply analogously to the second rail 19 of the pullout mechanism 10 of FIG. 1.

The invention claimed is:

1. A pullout mechanism for a drawer device, comprising:
   a first guide surface with a first and a second end and a second guide surface with a first and a second end;
   a first wheel for being rotated on the first guide surface and a second wheel for being rotated on the second guide surface, the second wheel being connected in a rotationally fixed manner to the first wheel, wherein the wheels are provided for being coupled to the drawer device and the guide surfaces are part of a frame which is provided such that the drawer device is moveable therein,
   wherein a first flexible pulling device at least partially encircles the first wheel and is fastened in a pre-stressed manner with a first end section to the first end of the first guide surface and with a second end to the second end of the first guide surface; and
   wherein a second flexible pulling device at least partially encircles the second wheel and is fastened in a pre-stressed manner with a first end section to the first end of the second guide surface and with a second end to the second end of the second guide surface.

2. The pullout mechanism according to claim 1, wherein the pullout mechanism additionally comprises a shaft which connects the wheels to each other in the rotationally fixed manner.

3. The pullout mechanism according to claim 1, wherein at least one wheel comprises a helical groove in which the corresponding pulling device is guided.

4. The pullout mechanism according to claim 1, wherein at least one pulling device is fastened to the corresponding wheel.

5. The pullout mechanism according to claim 1, wherein:
   at least one pulling device comprises a first part-pulling device and a second part-pulling device;
   the first part-pulling device is fastened in a pre-stressed manner to the first end of the corresponding guide surface and the corresponding wheel; and
   the second part-pulling device is fastened in a pre-stressed manner to the second end of the corresponding guide surface and the corresponding wheel.

6. The pullout mechanism according to claim 1, wherein at least one pulling device comprises a cable or a wire.

7. The pullout mechanism according to claim 1, wherein at least one of the first guide surface, the second guide surface, the first wheel, or the second wheel comprises a noise-absorbing coating, or at least one guide surface and at least one wheel comprise a noise-absorbing coating.

8. A pullout mechanism for a drawer device, comprising:
   a first guide surface with a first and a second end and a second guide surface with a first and a second end;
   a first wheel for being rotated along the first guide surface and a second wheel for being rotated along the second guide surface, the second wheel being connected in a rotationally fixed manner to the first wheel, wherein the wheels are provided for being coupled to a frame which is provided such that the drawer device is moveable therein and the guide surfaces are part of the drawer device, wherein a first flexible pulling device at least partially encircles the first wheel and is fastened in a pre-stressed manner with a first end section to a first end of the first guide surface and with a second end to a second end of the first guide surface; and
   wherein a second flexible pulling device at least partially encircles the second wheel and is fastened in a pre-stressed manner with a first end section to a first end of the second guide surface and with a second end to a second end of the second guide surface.

9. The pullout mechanism according to claim 8, wherein the pullout mechanism additionally comprises a shaft which connects the wheels to each other in the rotationally fixed manner.

10. The pullout mechanism according to claim 8, wherein at least one wheel comprises a helical groove in which the corresponding pulling device is guided.

11. The pullout mechanism according to claim 8, wherein at least one pulling device is fastened to the corresponding wheel.

12. The pullout mechanism according to claim 8, wherein:
   at least one pulling device comprises a first part-pulling device and a second part-pulling device;
   the first part-pulling device is fastened in a pre-stressed manner to the first end of the corresponding guide surface and the corresponding wheel; and
   the second part-pulling device is fastened in a pre-stressed manner to the second end of the corresponding guide surface and the corresponding wheel.

13. The pullout mechanism according to claim 8, wherein at least one pulling device comprises a cable or a wire.

14. The pullout mechanism according to claim 8, wherein at least one of the first guide surface, the second guide surface, the first wheel, or the second wheel comprises a noise-absorbing coating, or at least one guide surface and at least one wheel comprise a noise-absorbing coating.

15. A drawer device, comprising a frame, a first guide surface and a second guide surface, a push body and a pullout mechanism, wherein the first guide surface and the second guide surface are running along each other and wherein the pullout mechanism comprises:

a first wheel which runs along the first guide surface and a second wheel which runs along the second guide surface, wherein the wheels are coupled to the push body and the guide surfaces are provided for attachment to the frame, or the guide surfaces are attached to or formed on the push body and the wheels are provided for attachment to the frame;

a first flexible pulling device, which at least partially encircles the first wheel and is fastened in a pre-stressed manner with a first end section to a first end of the first guide surface and with a second end to a second end of the first guide surface; and a second flexible pulling device, which at least partially encircles the second wheel and is fastened in a pre-stressed manner with a first end section to a first end of the second guide surface and with a second end to a second end of the second guide surface.

16. The drawer device according to claim 15, wherein the frame is part or a component of an interior trim part.

17. A drawer device, comprising a frame, a push body with a first guide surface and a second guide surface and a pullout mechanism, wherein the first guide surface and the second guide surface are running along each other and wherein the pullout mechanism comprises:

a first wheel which runs along the first guide surface and a second wheel which runs along the second guide surface, wherein the wheels are coupled to the frame;

a first flexible pulling device, which at least partially encircles the first wheel and is fastened in a pre-stressed manner with a first end section to a first end of the first guide surface and with a second end to a second end of the first guide surface; and a second flexible pulling device, which at least partially encircles the second wheel and is fastened in a pre-stressed manner with a first end section to a first end of the second guide surface and with a second end to a second end of the second guide surface.

18. The drawer device according to claim 17, wherein the frame is part or a component of an interior trim part.

19. A vehicle, comprising a vehicle body, a drawer device and a pullout mechanism, wherein the pullout mechanism comprises:

a first guide surface with a first and a second end and a second guide surface with a first and a second end;

a first wheel which runs along the first guide surface and a second wheel which runs along the second guide surface and is connected in a rotationally fixed manner to the first wheel;

a first pulling device, which at least partially encircles the first wheel and is fastened in a pre-stressed manner to the two ends of the first guide surface; and a second pulling device, which at least partially encircles the second wheel and is fastened in a pre-stressed manner to the two ends of the second guide surface;

wherein the wheels are coupled to the drawer device and the guide surfaces are attached to or formed on the vehicle body or the guide surfaces are attached to or formed on the drawer device and the wheels are coupled to the vehicle body.

20. The vehicle according to claim 19, wherein:

the vehicle body comprises an interior trim part with a frame; and the guide surfaces are attached to or formed on the vehicle body in that they are attached to or formed on the frame, or the wheels are attached to the vehicle body in that they are coupled to the frame.

* * * * *